(12) United States Patent
Ressler et al.

(10) Patent No.: US 7,630,081 B2
(45) Date of Patent: Dec. 8, 2009

(54) INTERFEROMETER MAINTAINING OPTICAL RELATIONSHIP BETWEEN ELEMENTS

(75) Inventors: Gregg Ressler, Shelton, CT (US); Donald W. Sting, New Canaan, CT (US)

(73) Assignee: SAS Photonics, LLC, Danbury, CT (US)

( * ) Notice: Subject to any disclaimer, the term of this patent is extended or adjusted under 35 U.S.C. 154(b) by 391 days.

(21) Appl. No.: 11/622,815

(22) Filed: Jan. 12, 2007

(65) Prior Publication Data

US 2008/0170231 A1 Jul. 17, 2008

(51) Int. Cl.
*G01J 3/45* (2006.01)
*G01N 21/00* (2006.01)
*G01B 9/02* (2006.01)

(52) U.S. Cl. ..................................... 356/451
(58) Field of Classification Search ............... 356/452, 356/451, 455
See application file for complete search history.

(56) References Cited

U.S. PATENT DOCUMENTS

| | | | |
|---|---|---|---|
| 4,710,001 A | 12/1987 | Lacey | |
| 4,773,757 A * | 9/1988 | Doyle | 356/451 |
| 4,801,366 A * | 1/1989 | Godfrey | 356/344 |
| 5,133,598 A * | 7/1992 | Badeau | 356/452 |
| 5,173,744 A | 12/1992 | Dybwad | |
| 5,309,217 A | 5/1994 | Simon et al. | |
| 5,486,917 A | 1/1996 | Carangelo et al. | |
| 5,592,292 A | 1/1997 | Nanko et al. | |
| 5,883,712 A * | 3/1999 | Coffin | 356/452 |
| 5,949,544 A * | 9/1999 | Manning | 356/452 |
| 6,322,037 B1 | 11/2001 | Nanko et al. | |
| 2002/0149777 A1* | 10/2002 | Schreiber | 356/452 |
| 2005/0206889 A1* | 9/2005 | Koudelka et al. | 356/239.2 |

OTHER PUBLICATIONS

International Search Report for PCT/US2007/086713, Mailed May 7, 2008.
Written Opinion of the International Searching Authority for PCT/US2007/086713, Mailed May 7, 2008.
R. V. Jones; Some Uses of Elasticity in Instrument Design; Discourse Given at Annual Exhibition of the Institute of Physics and the Physical Society, Jan. 18, 1962, Natural Philosophy Dept., Univ. of Aberdeen, XP007904607; J. Sci. Instrum., 1962, vol. 39, pp. 193-203.

* cited by examiner

*Primary Examiner*—Gregory J Toatley, Jr.
*Assistant Examiner*—Scott M Richey
(74) *Attorney, Agent, or Firm*—Calfee, Halter & Griswold LLP

(57) ABSTRACT

An interferometer for Fourier transform infrared spectroscopy includes a fixed assembly including a housing, a beam splitter, and a mirror fixedly positioned relative to each other. A movable assembly includes a housing, a mirror, and a motor coil, fixedly positioned relative to each other. A first flat spring has an opening for providing an unobstructed optical path of radiation therethrough. A first end of the first flat spring is secured to the fixed assembly and a second end of the first flat spring is secured to the movable assembly for providing movement of the movable assembly relative to the fixed assembly via the first flat spring. An optical relationship between the beam splitter, the mirror of the fixed assembly, and the mirror of the movable assembly is maintained independent of a distance between the movable assembly and the fixed assembly.

18 Claims, 3 Drawing Sheets

INTERFEROMETER MAINTAINING OPTICAL RELATIONSHIP BETWEEN ELEMENTS

BACKGROUND

The present invention relates to interferometers. It finds particular application in conjunction with maintaining alignment of interferometers and will be described with particular reference thereto. It will be appreciated, however, that the invention is also amenable to other applications.

Michelson interferometers are known and have been used in many commercial applications. Also well known is that slight misalignment of the optical elements cause modulation changes that can significantly affect the performance of the interferometer. There have been numerous attempts in the design of commercial interferometers, Michelson interferometers included, to assure that either misalignments have been reduced, or that effects of misalignments have been reduced. Some of these attempts include passive means such as using cube corner mirrors, retro-mirrors, and/or other means to compensate undesirable effects. Others have used active means such as dynamic mirror alignment or active thermal control, among others. Alternatively, readily accessible adjustment mechanisms are made available to the user or maintainer of the interferometer that allows for periodic or necessary reestablishment of the relationships of the optical components to maintain an acceptable alignment condition.

The functioning of a Michelson interferometer is well known, based on the design of Michelson in 1891. Griffiths and deHaseth begin their book "Fourier Transform Infrared Spectroscopy" describing the operation of the Michelson interferometer. It is necessary to have a movable mirror that maintains its perpendicularity and flatness to a wave front while the mirror is moving or has moved to a new position. Any short or long term change (commonly referred to as optical instability) in the perpendicularity or flatness of either the fixed or movable mirrors to the wave front may produce compromised results. Similar results occur if the beam splitter changes flatness or angle relative to the wave front. While the effects of mirror misalignment are described in the Griffiths and deHaseth book, the authors make little attempt to address the specifics of the underlying causes of optical instability or loss of modulation efficiency.

Historically, interferometers have been designed with significant mass and thermal capacity for the purposes of reducing the misalignment effects of mechanical, acoustic, and thermal disturbances. Obviously, instruments using massive interferometers are not easily portable, or even easily movable at best. More recently there have been instruments designed for portability and which are designed to maintain alignment. One such instrument, described by Korb, et al., (Applied Optics, 1 Apr. 1996) and patented by Dybwad (U.S. Pat. No. 5,173,744) is reported to have been used for 3 years without the need for realignment. Unfortunately, the instrument and interferometer described therein requires the use of infrared transmitting prisms that require very stringent manufacturing tolerances, resulting in significant manufacturing costs.

More recently Simon et al. (U.S. Pat. No. 5,309,217) invented an interferometer using a pivot and retro-reflectors. Although the Simon et al. patent states the interferometer is stable, easily aligned, and a compact configuration, the invention presented in that patent requires a plurality of additional mirror surfaces and an increase in associated path length that significantly contributes to optical instability resulting from thermal change. Furthermore, the added optical elements and associated structure certainly challenge the use of the word "compact."

Flat spring/bearings have been used with interferometers. However, until now, such flat spring/bearings have required periodic realignment when significant temperature changes occur in the interferometer's operating environment. Although the means for realignment is typically achieved by means of an automatic alignment algorithm, actuated through precision stepper motors, the need for a realignment often occurs at inopportune times, which causes significant user inconvenience and/or frustration. In addition, significant costs (both monetary and space) are incurred to effect realignments.

The present invention provides a new and improved compact and portable interferometer system that maintains a condition of substantially permanent alignment without the need for expensive prisms or additional expensive optical elements.

SUMMARY

An interferometer for Fourier transform infrared spectroscopy includes a fixed assembly including a housing, a beam splitter, and a mirror fixedly positioned relative to each other. A movable assembly includes a housing, a mirror, and a motor coil, fixedly positioned relative to each other. A first flat spring has an opening for providing an unobstructed optical path of radiation therethrough. A first end of the first flat spring is secured to the fixed assembly and a second end of the first flat spring is secured to the movable assembly for providing movement of the movable assembly relative to the fixed assembly via the first flat spring. An optical relationship between the beam splitter and the mirror of the movable assembly is maintained independent of a distance between the movable assembly and the fixed assembly.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
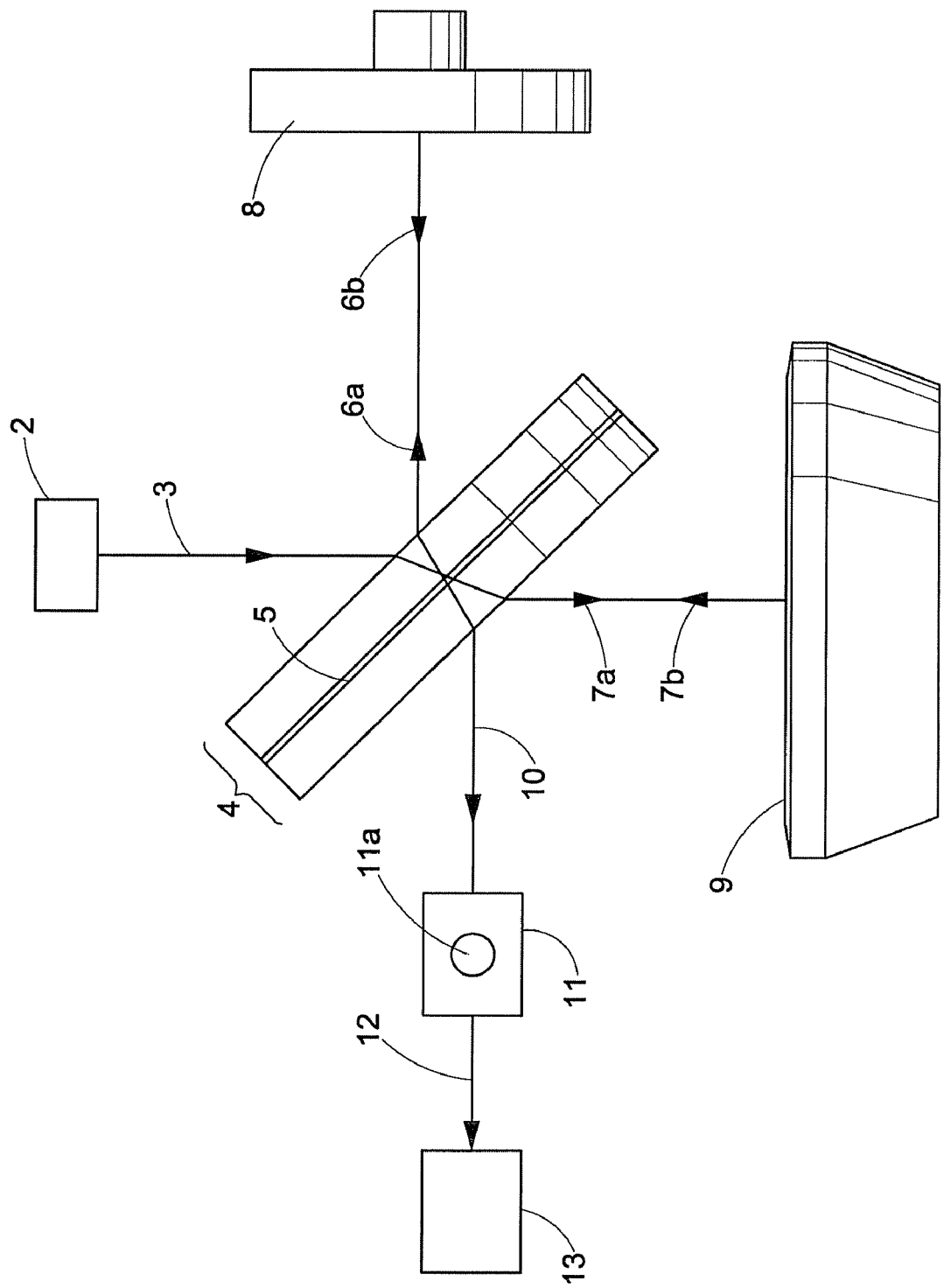
FIG. 1 illustrates a cross-sectional side elevational view of optical elements in a first embodiment of the present invention.
Figure 2:
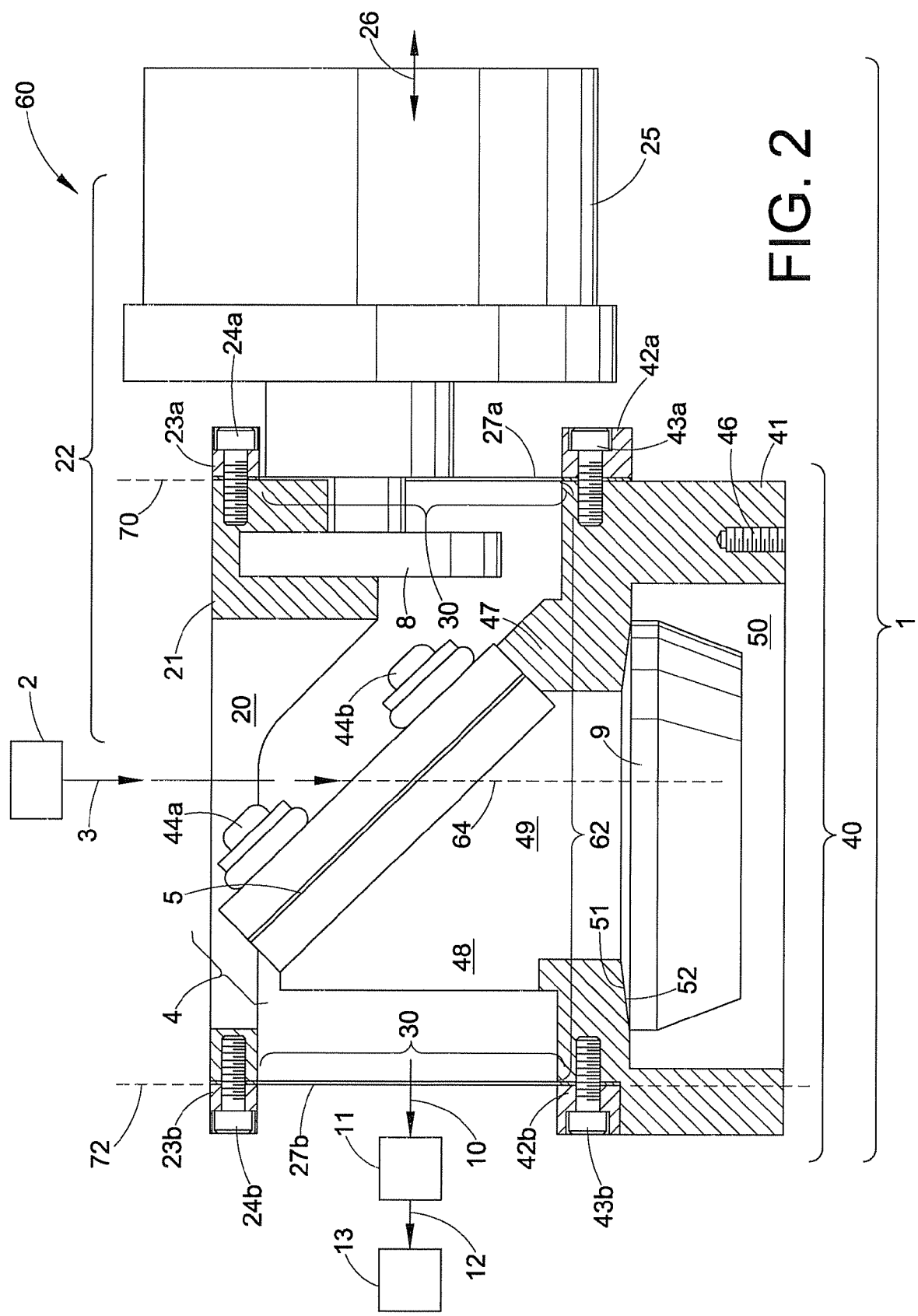
FIG. 2 illustrates a cross-section side elevational view of the first embodiment of the present invention.

With reference to FIGS. 1 and 2, optical elements, including a beam splitter 4, a movable mirror 8, and a fixed mirror 9, in an interferometer 1 are illustrated according to a first embodiment of the present invention. Infrared radiation 3 from a source of infrared radiation 2 is directed to the beam splitter 4, which includes a beam splitting surface 5. In one embodiment, the interferometer is used for Fourier transform infrared (FTIR) spectroscopy. The infrared radiation 3 is split by the beam splitting surface 5 into a reflected portion 6a and a transmitted portion 7a. The reflected portion 6a continues on to the movable mirror 8, which reflects the reflected portion 6a back onto itself as a reflected beam 6b that returns to the beam splitting surface 5. In a similar fashion, the transmitted portion 7a continues on to a fixed mirror 9, which reflects the transmitted portion 7a back onto itself as a reflected beam 7b that returns to beam splitting surface 5. The reflected beams 6b, 7b are recombined at the beam splitting surface 5 and a portion of the reflected beams 6b, 7b is reflected as a recombined radiation beam 10. The recombined radiation beam 10 then continues on to a sampling apparatus 11. The sampling apparatus 11 modifies the recombined radiation beam 10 into a sample encoded radiation 12 as a function of a sample 11a in the sampling apparatus 11. The sample encoded radiation 12 continues on to a detection system 13. The sample 11a is identified as a function of the encoded radiation 12.

When the respective optical distances from the beam splitting surface 5 to the mirrors 8, 9 are substantially equal, the recombined radiation beam 10 remains in phase, as there is no optical retardation. If the movable mirror 8 moves either closer to or further from the beam splitting surface 5, but remains perpendicular to the reflected beam 6b of the reflected portion 6a, a retardation change is created. The retardation change modulates the recombined radiation beam 10.

When using the interferometer 1 as part of a rapid scanning Fourier transform infrared (FTIR) system 60, the movable mirror 8 is typically driven at a constant velocity so as to modulate the recombined radiation beam 10 in a known way that may subsequently be Fourier transformed to recover frequency information of the recombined radiation beam 10 and/or the sample encoded infrared radiation 12.

If one or more of the optical elements including the beam splitter 4, the movable mirror 8, and/or the fixed mirror 9 change(s) position(s), or if the optical relationships change between the beam splitter 4, the movable mirror 8, and/or the fixed mirror 9, some amount of modulation change occurs in the recombined radiation beam 10. Such unintended changes in modulation produce unwanted effects and, therefore, are undesirable.

A fixed housing 41 acts as a structural member of a fixed housing assembly 40. The fixed housing assembly 40 includes the beam splitter 4, the fixed mirror 9, clamps 42a, 42b, fasteners 43a, 43b, beam splitter fasteners 44a, 44b, and o-rings 45. Multiple threaded holes 46 are provided for affixing the interferometer 1 to, for example, a frame, instrument housing, or base plate (not shown). A cavity 47 in the fixed housing 41 is provided to receive the beam splitter 4. Holes 48, 49 provide clearance for the recombined radiation 10 and the beam splitting radiation portions 7a, 7b.

The infrared radiation 3 from the source of infrared radiation 2 enters a movable housing 21 of the interferometer 1 via a through hole defined by a wall 20 in the movable housing 21. The movable housing 21 is a structural member of a movable assembly generally noted by 22, which includes clamp members 23a, 23b, fasteners 24a, 24b, the movable mirror 8, and a motor coil assembly 25. All components of the movable assembly 22 are rigidly fastened to the movable housing 21 to form a rigid unit that moves together when actuated by an electromagnetic force 26 exerted on the motor coil assembly 25. The electromagnetic force 26 is largely exerted either to the left or to the right as illustrated, depending on the polarity of the voltage exerted on the motor coil assembly 25. The use of motor coils for driving movable mirrors of interferometers to achieve retardation (e.g., distance) between the fixed and movable assemblies 40, 22, respectively, is known in the art.

The movable assembly 22 is further rigidly affixed to flat spring/bearings 27a, 27b at each end of movable housing 21 via the clamp members 23a, 23b and the fasteners 24a, 24b. The two flat spring/bearings 27a, 27b are substantially the same size, shape, and thickness. Furthermore, when the spring/bearing 27a is clamped by the clamp members 23a, 42a and the fasteners 24a, 43a to the movable housing 21 and the fixed housing 41, and when the spring/bearing 27b is clamped by the clamp members 23b, 42b and the fasteners 24b, 43b to the movable housing 21 and the fixed housing 41, the spring/bearings 27a, 27b have substantially the same unrestricted active spring/bearing length 30.

The clamp members 23a, 23b, 42a, 42b and the fasteners 24a, 24b, 43a, 43b act as a means to affix the flat springs/bearings 27a, 27b to the housings 21, 41 while allowing movement between the movable and fixed assemblies 22, 40. In alternate embodiments, adhesives, braise solder, welding, epoxy, and extruded metal are used to affix the flat springs/bearings to the housings.

In the illustrated embodiment, the beam splitter 4, the mirror 9 of the fixed assembly 40, and the mirror 8 of the movable assembly 22 are positioned in a space between planes 70, 72 containing the first and second flat springs 27a, 27b in their flat condition. The first and second flat springs 27a, 27b restrict movement of the movable assembly 22. Because of the restricted movement, a plane containing the mirror 8 of the movable assembly 22 is parallel to all planes containing the mirror 8 of the movable assembly 22 at all retardations (e.g., distances) between the fixed and movable assemblies 40, 22, respectively, of interest so that the optical relationship between the beam splitter 4 and the mirror 8 of the movable assembly 22 remains substantially unchanged except for the retardation. In other words, the optical relationship between the beam splitter 4 and the mirror 8 of the movable assembly 22 is maintained independent of a distance between the movable assembly 22 and the fixed assembly 40.

The optical relationship between the beam splitter 4 and the mirror 8 of the movable assembly 22 is satisfied when an angle of a surface of the beam splitter 4 is maintained relative to an angle of a surface of the mirror 8 of the movable assembly 22. Similarly, the optical relationship between the beam splitter 4 and the mirror 8 of the movable assembly 22 is satisfied when an angle of an axis of a beam, from the beam splitter 4 toward the mirror 8 of the movable assembly 22, is maintained at a predetermined angle relative to the surface of the mirror 8 of the movable assembly 22.

As discussed above, the beam splitter 4, the mirror 9 of the fixed assembly 40, and the mirror 8 of the movable assembly 22 are positioned in the space between planes 70, 72 containing the first and second flat springs 27a, 27b in their flat condition. However, other embodiments in which one or more of the beam splitter 4, the mirror 9 of the fixed assembly 40, and the mirror 8 of the movable assembly 22 are not positioned in the space between planes 70, 72 are also contemplated.

Figure 3:
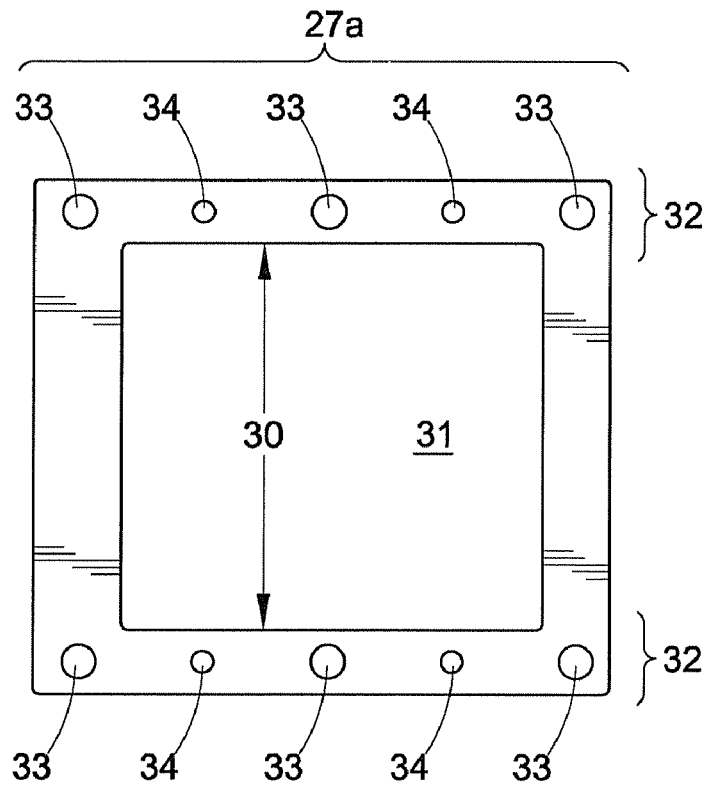
FIG. 3 illustrates a front elevational view of spring pairs used in the first embodiment of the present invention.

FIG. 3 illustrates the spring/bearing 27a. It is to be understood that the spring/bearing 27a is representative of the spring/bearing 27b. With reference to FIGS. 1-3, the spring/bearing 27a includes a substantially rectangular opening 31 for providing unrestricted transmission of the recombined radiation 10. The rectangular opening 31 also provides appropriate modulus characteristics for both bearing the weight of the movable assembly and providing resistance to undesirable shocks, torques, and shears imposed by environmental forces. It is to be understood that changing the location of the source 2 with the sampling apparatus 11 and the detection system 13 is known to those in the art. Although the opening 31 is rectangular in the illustrated embodiment, it is to be understood that other embodiments including other shapes for the opening of the spring/bearing are also contemplated.

In the illustrated embodiment, the clamped areas 32 of the spring/bearing 27*a* further align with the edges of the clamp members 23*a*, 42*a* (23*b*, 42*b* for the spring/bearing 27*b*) to define the unrestricted clamping length 30. Clearance holes 33 are provided for the fasteners 24*a*, 43*a* (24*b*, 43*b* for the spring/bearing 27*b*), and alignment holes 34 are provided to accommodate high tolerance pins (not shown) for precise positioning. Although the opening 31 is rectangular in the illustrated embodiment, it is to be understood that other embodiments are also contemplated in which the opening 31 is oblong, elliptical, circular, or any other shape that might improve robustness and/or stability.

Figure 4:
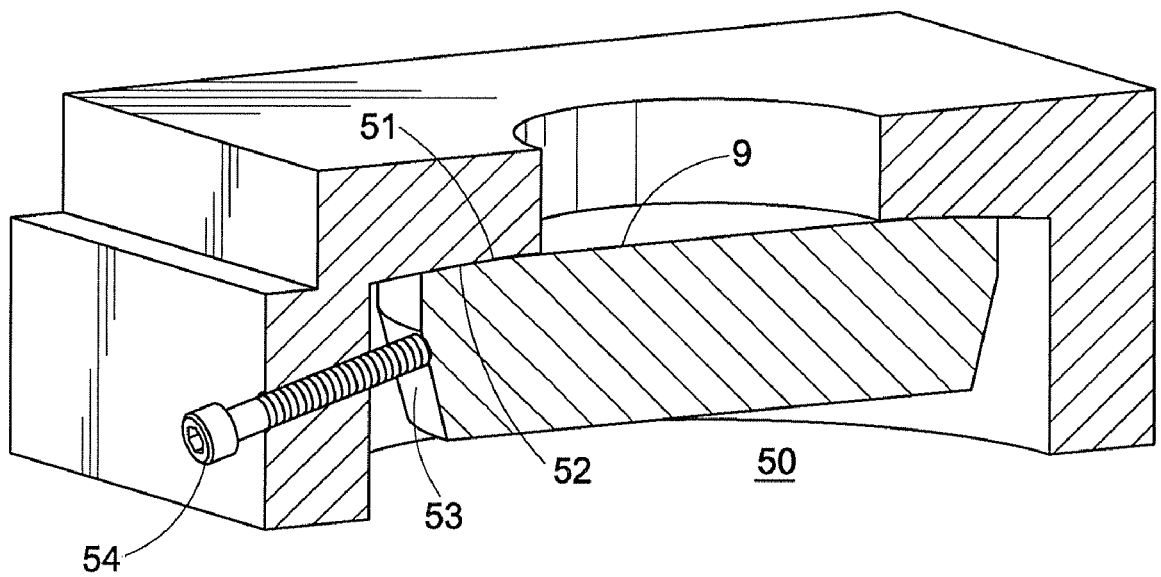
FIG. 4 illustrates an isometric cross-sectional view showing detail of a fixed mirror and mechanism for affixing it to a fixed interferometer housing.

With reference to FIGS. 2 and 4, the fixed mirror 9 is positioned in a fixed mirror cavity 50. More specifically, a spherical surface portion 51 of the fixed housing 41 contacts a spherical surface portion 52 of the fixed mirror 9. Six (6) adjustment screws, one of which is illustrated as 54, contact a conical section 53 of the fixed mirror 9. In one embodiment, the screws 54 are placed approximately symmetrically around a circumference of the conical surface 53. In this manner, the screws 54 are used both to adjust the orientation of the fixed mirror 9 and, once the adjustment is complete, to rigidly affix the mirror 9 to the fixed housing 41.

During use, the two primary sources of optical misalignment and instability are strains from mechanical and thermal stresses on the interferometer 1. In one embodiment, the flat spring/bearings 27*a*, 27*b* are manufactured in matched sets and assembled to the movable and fixed assemblies 22, 40, respectively, to assure substantially precisely repeatable trajectories and relationships between the mirror 8 on the movable assembly 22 and the beam splitter/fixed mirror 4, 9, which remain precisely fixed relative to each other.

Using at least one pair of the flat springs 27*a*, 27*b* whose respective planes bound a space 62 that contains the interferometer optical elements (e.g., the beam splitter 4, the movable mirror 8, and the fixed mirror 9) provides significant symmetry, minimum optical path lengths for the radiation, and minimum structural lengths. These features, along with the proper selection of materials, minimizes the effects of thermal changes in the surrounding spaces. The illustrated design further provides a clear optical path for input or output radiation and a mechanical means for conveniently driving the movable assembly 22 including the mirror 8 included therein. Simultaneously, the symmetry and compactness of the flat springs 27*a*, 27*b* minimize strains from thermal and mechanical stresses. Significantly reduced strains results in significantly improved optical stability.

Temperatures change constantly and are typically unpredictable in many instrument operating environments. Interferometers that need to function in such environments typically need to (1) be isolated from the changes, (2) have compensation means to counteract the effects of the changes, and/or (3) be designed in such a way that the effects of such changes are minimized. Historically, interferometers have been designed to be isolated from environmental changes and to counteract the effects of environmental changes. The illustrated embodiment of the present invention helps reduce and/or minimize the effects of environmental changes.

In general, the dimensions of a substance increases as the temperature of the substance itself increases. This relationship is typically stated according to the following formula:

$$L = L_o(1 + A(t - t_o))$$

where $L_o$ is the length of an object at temperature, $t_o$

A is the coefficient of linear expansion, and

L is the length of the object at temperature, t

The coefficient of linear expansion, A, is known and documented for most commonly known materials. In an infrared interferometer, the selection of the beam splitter material determines the useful frequency range of the instrument. One commonly used material, Zinc Selenide (ZnSe) has $A = 7.2 \times 10^{-6}$/C. When using a typical one inch diameter (25.4 millimeters) beam splitter, there is approximately 1.5 microns of diameter change for each ten degree change on the centigrade scale if the diameter is unrestricted. While this change appears relatively small, it is capable of creating enormous stresses if the beam splitter were constrained. For example, for a ZnSe beam splitter that is securely affixed to an aluminum housing (a very common practice in commercial FTIR's) the aluminum would attempt to change at approximately three times the rate of the ZnSe. The resulting stress, if not properly dissipated, could result in surface distortion and/or angular (e.g., tilt) change that could result in modulation change and instability.

In one embodiment, the fixed housing 41, the movable housing 21, the first and second flat springs 27*a*, 27*b*, the clamp members 23*a*, 23*b*, 42*a*, 42*b*, the fasteners 24*a*, 24*b*, 43*a*, 43*b*, and the mirrors 8, 9 are steel. In addition, it is contemplated that the mirrors 8, 9 include a metalized film for improved reflectivity in the infrared range.

Steel and titanium have coefficients of thermal expansion much closer to that of ZnSe. Therefore, using steel or titanium in place of aluminum for the housing would reduce the strain differential between the ZnSe and the housing. However, the benefit of improving strain differential by changing from aluminum to steel or titanium to overcome other factors such as shape, thermal conductivity, thermal absorption, and thermal emissivity, among others, has not been previously demonstrated. Presumably, the improved strain differential has alone not achieved improved results because other factors have been a major source of optical instability. In that regard, our invention strongly suggests that the roles of shape and symmetry are of equal, if not greater, importance than the role of differential coefficients of thermal expansion.

The illustrated embodiment of the present invention has established that combining highly symmetrical, minimum volume shapes and corresponding minimum path lengths for the interferometer reflected and transmitted portions 6*a*, 7*a*, respectively, and the reflected beams 6*b*, 7*b* has resulted in highly stable modulation over a wide temperature range. Minimizing differences between the coefficients of thermal expansion further improves optical stability.

With reference again to FIG. 2, the illustrated embodiment shows the interferometer 1 is symmetrical about a plane 64, which is located midway between the sides of the interferometer 1 and the plane of the sheet of paper on which the section shown in FIG. 2 is illustrated. Thermal changes to the flat spring/bearings 27*a*, 27*b* are substantially identical since the surface areas of the springs are substantially identical and are exposed to convection in much the same manner. The structural differences between optical components are held to a minimum, determined by the highest resolution possible for the interferometer, and for the beam splitter size being used.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An interferometer for Fourier transform infrared spectroscopy, comprising:
    a fixed assembly including a housing, a beam splitter, and a mirror fixedly positioned relative to each other;
    a movable assembly including a housing, a mirror, and a motor coil, fixedly positioned relative to each other;
    a first flat spring, having an opening for providing an unobstructed optical path of radiation therethrough, a first end of the first flat spring being secured to the fixed assembly and a second end of the first flat spring being secured to the movable assembly for providing movement of the movable assembly relative to the fixed assembly via the first flat spring;
    a second flat spring for providing a clearance for at least one of the mirror of the movable assembly and the motor coil, a first end of the second flat spring being secured to the fixed assembly and a second end of the second flat spring being secured to the movable assembly, the first and second flat springs cooperating with the fixed and movable assemblies to maintain a relationship between respective physical orientations of the beam splitter and the mirror of the movable assembly independent of a distance between the movable assembly and the fixed assembly, a surface of the mirror substantially not angularly deflecting as the movable assembly is translated relative to the fixed assembly; and
    the beam splitter, the mirror of the fixed assembly, and the mirror of the movable assembly being positioned in a space between the planes containing the first and second flat springs while in respective flat conditions.

2. The interferometer for Fourier transform infrared spectroscopy as set forth in claim 1, wherein the relationship between the physical orientations of the beam splitter and the mirror of the movable assembly is satisfied when an angle of a surface of the beam splitter is maintained relative to an angle of a surface of the mirror of the movable assembly.

3. The interferometer for Fourier transform infrared spectroscopy as set forth in claim 1, wherein the relationship between the physical orientations of the beam splitter and the mirror of the movable assembly is satisfied when an angle of a beam, from the beam splitter toward the mirror of the movable assembly, is maintained at a predetermined angle relative to a surface of the mirror of the movable assembly.

4. The interferometer for Fourier transform infrared spectroscopy as set forth in claim 1, wherein the second flat spring has an opening of substantially equal size, shape, and thickness as the opening of the first flat spring.

5. The interferometer for Fourier transform infrared spectroscopy as set forth in claim 1, wherein:
    the first and second flat springs restrict movement of the movable assembly relative to the fixed assembly; and
    the restricted movement of the movable assembly maintains a plane containing the mirror of the movable assembly parallel to all of planes containing the mirror of the movable assembly at respective distances between the movable and fixed assemblies.

6. The interferometer for Fourier transform infrared spectroscopy as set forth in claim 1, further comprising:
    means to affix the first flat spring to the fixed housing and to the movable housing.

7. The interferometer for Fourier transform infrared spectroscopy, as set forth in claim 6, further comprising:
    means to affix the second flat spring to the fixed housing and to the movable housing.

8. The interferometer for Fourier transform infrared spectroscopy as set forth in claim 7, wherein the housing of the fixed assembly, the housing of the movable assembly, the first and second flat springs, the means to affix the first flat spring, and the means to affix the second flat spring are steel.

9. The interferometer for Fourier transform infrared spectroscopy as set forth in claim 7, wherein the housing of the fixed assembly, the housing of the movable assembly, the first and second flat springs, the means to affix the first flat spring, and the means to affix the second flat spring are titanium.

10. The interferometer for Fourier transform infrared spectroscopy as set forth in claim 1, wherein both of the mirrors include a metalized film for improved reflectivity in the infrared range.

11. A Fourier transform infrared spectroscopy system, the system comprising:
    a source producing infrared radiation;
    an interferometer for Fourier transform infrared spectroscopy receiving the infrared radiation, the interferometer comprising:
        a fixed assembly including a housing, a beam splitter, and a mirror fixedly positioned relative to each other;
        a movable assembly including a housing, a hole for receiving the infrared radiation from the source, a mirror, and a motor coil, fixedly positioned relative to each other, the infrared radiation passing from the hole to the beam splitter, the beam splitter splitting the radiation into a first component that is directed to and reflected from the mirror in the fixed assembly and a second component that is directed to and reflected from the mirror in the movable assembly, the reflected first and second components of the radiation being combined at the beam splitter into a recombined radiation;
        a first flat spring, having an opening for providing an unobstucted optical path of the recombined infrared radiation therethrough, a first end of the first flat spring being secured to the fixed assembly and a second end of the first flat spring being secured to the movable assembly, a plane containing the mirror of the movable assembly being parallel to all planes containing the mirror of the movable assembly at respective retardations between the movable and fixed assemblies so that an axis of a beam from the beam splitter toward the mirror of the movable assembly is maintained at a predetermined angle relative to a surface of the mirror of the movable assembly at any of the retardations; and
        a second flat spring for providing a clearance for moving at least one of the mirror of the movable assembly and the motor coil, a first end of the second flat spring being secured to the fixed assembly and a second end of the second flat spring being secured to the movable assembly, the first and second flat springs cooperating with the fixed and movable assemblies to maintain a relationship between respective physical orientations of the beam splitter and the mirror of the movable assembly independent of a distance between the movable assembly and the fixed assembly, a surface of the mirror substantially not angularly deflecting as the movable assembly is translated relative to the fixed assembly;

the beam splitter, the mirror of the fixed assembly, and the mirror of the movable assembly being positioned in a space between planes containing the first and second flat springs while in respective flat conditions; and a detection system for receiving the recombined radiation.

12. The Fourier transform infrared spectroscopy system as set forth in claim 11, wherein the second flat spring has an opening of substantially equal size, shape, and thickness as the opening of the first flat spring.

13. A method for Fourier transform infrared spectroscopy, the method including:

receiving the infrared radiation into a movable housing of an interferometer;

maintaining a relationship between physical orientations of a beam splitter of a fixed assembly of the interferometer and a mirror of a movable assembly of the interferometer as unchanged at respective distances between the fixed and movable assemblies while the beam splitter, the mirror of the fixed assembly, and the mirror of the movable assembly are positioned in a space between planes containing first and second flat springs while in respective flat conditions, the first and second flat springs cooperating with the fixed and movable assemblies to maintain the relationship between respective physical orientations of the beam splitter and the mirror of the movable assembly independent of a distance between the movable assembly and the fixed assembly, a surface of the mirror substantially not angularly deflecting as the movable assembly is translated relative to the fixed assembly;

passing the radiation from the movable housing to and through a sample for producing encoded radiation as a function of the sample; and receiving the encoded radiation at a detection system.

14. The method for Fourier transform infrared spectroscopy as set forth in claim 13, wherein the step of maintaining includes:

maintaining a predetermined angle between a beam from the beam splitter and a surface of the mirror of the movable assembly.

15. The method for Fourier transform infrared spectroscopy as set forth in claim 13, wherein the step of maintaining a plane includes:

flexing a first end of the first flat spring, which is secured to the fixed assembly, relative to a second end of the first flat spring, which is secured to the movable assembly.

16. The method for Fourier transform infrared spectroscopy as set forth in claim 15, wherein the step of maintaining a plane further includes:

flexing a first end of the second flat spring, which is secured to the fixed assembly, relative to a second end of the second flat spring, which is secured to the movable assembly.

17. The method for Fourier transform infrared spectroscopy as set forth in claim 16, wherein receiving the infrared radiation includes:

passing the infrared radiation along an unobstructed optical path through the second flat spring.

18. The method for Fourier transform infrared spectroscopy as set forth in claim 13, further including:

identifying the sample as a function of the encoded radiation.

* * * * *